US008872630B2

(12) United States Patent
Duan et al.

(10) Patent No.: US 8,872,630 B2
(45) Date of Patent: Oct. 28, 2014

(54) METHOD AND APPARATUS FOR CABINET ASSET MANAGEMENT, AND CABINET SYSTEM

(71) Applicant: Huawei Technologies Co., Ltd., Guangdong (CN)

(72) Inventors: Weifeng Duan, Shenzhen (CN); Qingyin Fang, Shenzhen (CN); Zhen Luo, Shenzhen (CN); Shen Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/661,845

(22) Filed: Oct. 26, 2012

(65) Prior Publication Data

US 2013/0207784 A1 Aug. 15, 2013

Related U.S. Application Data

(63) Continuation of application No. PCT/CN2012/078466, filed on Jul. 11, 2012.

(30) Foreign Application Priority Data

Feb. 13, 2012 (CN) .......................... 2012 1 0031495

(51) Int. Cl.
*H04Q 5/22* (2006.01)

(52) U.S. Cl.
USPC ..... 340/10.1; 340/10.3; 340/10.31; 340/10.5; 340/572.1; 340/572.7; 235/375; 235/385

(58) Field of Classification Search
CPC ....... H01Q 1/2225; H01Q 1/007; H01Q 1/12; H01Q 1/1207; H01Q 1/1214; H01Q 1/1221; H01Q 1/22; H01Q 1/2208; H01Q 1/2216; H01Q 1/2258; H01Q 1/2283; H01Q 21/00; H01Q 21/06; H01Q 21/29; H01Q 23/00
USPC ......................... 340/10.1–10.6, 572.1–572.9; 235/375–386
See application file for complete search history.

(56) References Cited

U.S. PATENT DOCUMENTS 6,323,782 B1 * 11/2001 Stephens et al. ........... 340/10.31
7,173,518 B2 * 2/2007 Hulvey ...................... 340/10.31

(Continued)

FOREIGN PATENT DOCUMENTS

CN 200943390 Y 9/2007
CN 101079111 A 11/2007

(Continued)

OTHER PUBLICATIONS

International Search Report and Written Opinion of the International Searching Authority in corresponding International Patent Application No. PCT/CN2012/078466 (Nov. 22, 2012).

*Primary Examiner* — Steven Lim
*Assistant Examiner* — Ryan Sherwin
(74) *Attorney, Agent, or Firm* — Leydig, Voit & Mayer, Ltd.

(57) ABSTRACT

Embodiments of the present invention provide an apparatus and a method for cabinet asset management and a cabinet system. The apparatus for cabinet asset management includes a management unit and at least one antenna board unit. The management unit sends a read signal to the antenna board unit. After receiving the read signal, the antenna board unit sends the read signal in a form of an electromagnetic wave, so that after sensing a magnetic field signal, a label within a radiation range of the electromagnetic wave sends, using an induction current, configuration information of a physical component stored in the label to the antenna board unit. After receiving the configuration information, the antenna board unit reports the configuration information to the management unit. After receiving the configuration information reported by the antenna board unit, the management unit performs data analysis processing.

10 Claims, 11 Drawing Sheets

(56) References Cited

U.S. PATENT DOCUMENTS

| | | | | |
|---|---|---|---|---|
| 7,378,966 | B2 | 5/2008 | Agarwal et al. | |
| 7,538,681 | B1 * | 5/2009 | Sharma et al. | 340/572.7 |
| 7,701,340 | B2 * | 4/2010 | Poasevara | 340/572.1 |
| 8,215,549 | B2 * | 7/2012 | Arpino | 235/385 |
| 2006/0003760 | A1 * | 1/2006 | Li et al. | 455/424 |
| 2006/0092042 | A1 | 5/2006 | Davis et al. | |
| 2006/0132287 | A1 * | 6/2006 | Phipps et al. | 340/10.1 |
| 2009/0121843 | A1 * | 5/2009 | Bauchot et al. | 340/10.31 |
| 2009/0256680 | A1 * | 10/2009 | Kilian | 340/10.1 |

FOREIGN PATENT DOCUMENTS

| | | | |
|---|---|---|---|
| CN | 201233608 | Y | 5/2009 |
| CN | 101500401 | A | 8/2009 |

* cited by examiner

METHOD AND APPARATUS FOR CABINET ASSET MANAGEMENT, AND CABINET SYSTEM

CROSS-REFERENCE TO RELATED APPLICATIONS

This application is a continuation of International Patent Application No. PCT/CN2012/078466, filed on Jul. 11, 2012, which claims priority to Chinese Patent Application No. 201210031495.5, filed on Feb. 13, 2012, both of which are hereby incorporated by reference in their entireties.

FIELD OF THE INVENTION

The present invention relates to the field of communications, and in particular to a method and an apparatus for cabinet asset management, and a cabinet system.

BACKGROUND OF THE INVENTION

For an existing typical communication cabinet system, generally, a cabinet is located in a local end of an outdoor site, and a remote network management center is located in a remote central equipment room. The remote network management center implements interconnection and communication with a device of the cabinet through a management channel and a service information channel in a communication manner, such as the Internet (Internet). The interior of the cabinet is configured with various physical components required by the device, such as a power distribution component, a power supply system, a service processing component, and a passive physical component. Functions of the remote remote network management center are mainly performing initial physical parameter configuration for an internal device in the cabinet and performing maintenance management (including asset management) on running information of the device. Various internal physical components in the cabinet connect to each other through cables, backplane interconnection signals and so on. The cabinet and an external device (such as a tower and a radio frequency device) are connected through a cable, an optical fiber and so on.

An existing communication cabinet asset management system mainly includes two parts: a cabinet device of a local end and a remote network management center. A cabinet management center communicates with the remote network management center through a bus such as a fast Ethernet (FE, Fast Ethernet) bus. The interior of the cabinet device is configured with various asset components. An electrical label module is integrated in each asset component, and is configured to store asset information, production-manufacturing information and so on of the component. The cabinet management center is responsible for information management of internal asset components in the cabinet. The remote network management center is responsible for configuration and maintenance of asset information of physical components in the cabinet.

The following problems exist in the existing communication cabinet asset management system. First, a diversity of cabinet types exists, configuration types of internal physical components in the cabinet are complex, the asset information is manually configured in the existing asset management system, and maintenance work of the system is complex and costly. Therefore, asset configuration situations of the physical components cannot be managed and updated in real time during upgrade expansion of inventory devices and maintenance and replacement of devices on an existing network, and presence information and asset information can be determined by the cabinet asset management system only after the internal physical components are powered on.

SUMMARY OF THE INVENTION

Embodiments of the present invention provide an apparatus for cabinet asset management, a cabinet system, and a method for cabinet asset management, which can implement space locating of a internal physical component in a communication cabinet and dynamic and real-time management of asset information, reduce complexity of maintenance and management of asset information of the internal physical component in the cabinet, and implement a real-time update of asset configuration information.

In one aspect, an apparatus for cabinet asset management is provided, including: a management unit and at least one antenna board unit. The management unit and the antenna board unit are connected through a bus. The management unit is configured to send a read signal to the antenna board unit through the bus, to instruct the antenna board unit to acquire configuration information of a physical component. The antenna board unit is configured to receive the read signal and send the read signal in a form of an electromagnetic wave. The antenna board unit is further configured to receive the configuration information of the physical component, where the configuration information is sent by a label within a radiation range of the electromagnetic wave after the read signal is received, and report the configuration information to the management unit through the bus. The label is located on the physical component and stores the configuration information of the physical component. The management unit is further configured to receive the configuration information reported by the antenna board unit and perform analysis processing on the configuration information.

In another aspect, a cabinet system is provided, including: an apparatus for cabinet asset management and at least one physical component. One corresponding label is set in each physical component. The label stores configuration information of the corresponding physical component. The apparatus for cabinet asset management includes a management unit and at least one antenna board unit. The management unit and the antenna board unit are connected through a bus. The management unit is configured to send a read signal to the antenna board unit through the bus, to instruct the antenna board unit to acquire configuration information of a physical component. The management unit is further configured to receive the configuration information reported by the antenna board unit and perform analysis processing on the configuration information. The antenna board unit is configured to receive the read signal and send the read signal in a form of an electromagnetic wave. The antenna board unit is further configured to receive the configuration information of the corresponding physical component, where the configuration information is sent by a label within a radiation range of the electromagnetic wave after the read signal is received, and report the configuration information to the management unit through the bus.

In still another aspect, a method for cabinet asset management is provided. The cabinet includes a management unit and one or more cabinet physical partitions. Each cabinet physical partition includes an antenna board unit and one or more physical components. The method includes: transmitting, by the management unit, a control signal to an antenna board unit of each cabinet physical partition of the one or more cabinet physical partitions through a control bus; and according to the control signal, reading, by the antenna board unit in each cabinet physical partition, first configuration information of a physical component in a wireless manner, and transmitting the first configuration information to the management unit through a data bus; or according to the control signal, acquiring, by the antenna board unit of each cabinet physical partition, second configuration information from the management unit through the data bus and writing the second configuration information into a physical component in a wireless manner.

In the technical solutions in the embodiments of the present invention, the management unit is used to control the antenna board unit to send the read signal in the form of the electromagnetic wave to read asset information of the physical component stored in an electronic label located within the radiation range of the electromagnetic wave, and performs statistics collection and analysis on the asset information of the physical component. In this way, dynamic and real-time management on the asset information of the internal physical component in a communication cabinet is implemented, and complexity of maintenance and management of the asset information of the internal physical components in the cabinet is reduced, thereby implementing uniform management of internal configuration information of the cabinet, and implementing a real-time update of asset configuration information.

BRIEF DESCRIPTION OF THE DRAWINGS

To illustrate technical solutions in embodiments of the present invention more clearly, the following briefly introduces accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

Figure 1:
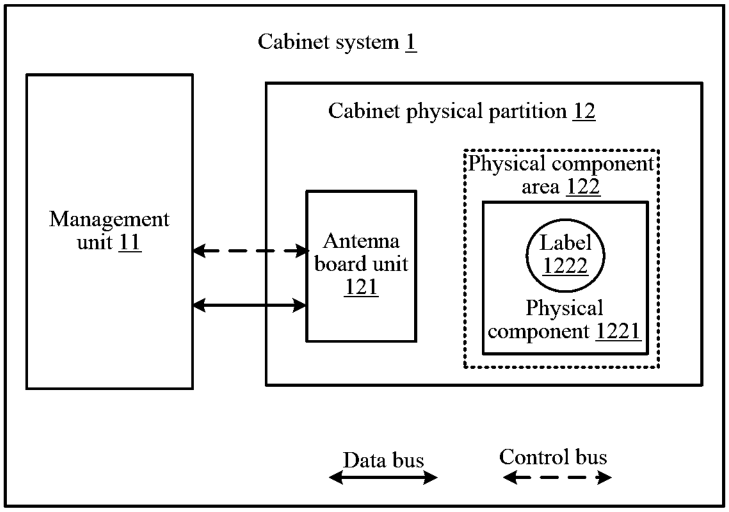
FIG. 1 is a schematic structural diagram of a cabinet system according to an embodiment of the present invention.

Technical solutions in embodiments of the present invention are described clearly and completely in the following with reference to accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In the following embodiments of the present invention, a new-type communication cabinet based on a wireless technology and a method for identifying a configuration of a physical component in the cabinet are provided and can implement application of power-free multi-module and multi-cascading cabinet management of internal physical components in the cabinet, thereby efficiently solving problems in asset management of an existing communication cabinet, such as management complexity, manual configuration, and real-time.

A cabinet system according to an embodiment of the present invention is described below with reference to FIG. 1. A cabinet system 1 includes a management unit 11 and a cabinet physical partition 12. The cabinet physical partition 12 includes an antenna board unit 121 and a physical component area 122. The management unit 11 and the antenna board unit 121 form an apparatus for cabinet asset management in the embodiment of the present invention. The apparatus for cabinet asset management is configured to perform management of a physical component in the cabinet physical partition inside the cabinet.

Specifically, between the management unit 11 and the antenna board unit 121 of the cabinet physical partition 12, a control signal is transmitted through a control bus and a data signal is transmitted through a data bus. In addition, the antenna board unit 121 and the physical component area 122 are connected in a wireless manner. Here, the wireless manner includes but is not limited to a radio frequency identification (RFID, Radio Frequency Identification) technology. The data bus includes but is not limited to an FE, a serial peripheral interface (SPI, serial peripheral interface), a PCIE (Peripheral Component Interconnect Express, peripheral component interconnect express), and the like. Generally, the RFID technology is a wireless communication identification technology. As can be seen above, in the structure of the cabinet system 1, the physical component area 122 does not need to be powered on and only the antenna board unit 121 needs to be powered on through the management unit 11. Therefore, the antenna board unit 121 may acquire configuration information of each physical component in the physical component area 122 using the RFID technology.

For the apparatus for cabinet asset management, the management unit 11 sends a read signal to one antenna board unit 121 through a data bus. After receiving the read signal, the antenna board unit 121 sends the read signal in a form of an electromagnetic wave, so that a label within a radiation range of the electromagnetic wave sends, after sensing a magnetic field signal, configuration information of a physical component stored in the label to the antenna board unit 121 using an induction current. After receiving the configuration information, the antenna board unit 121 reports the configuration information to the management unit 11. After receiving the configuration information reported by the antenna board unit 121, the management unit 11 performs data analysis processing.

Generally, the physical component may be placed in the physical component area 122 in the cabinet system 1 (such as a physical component 1221 shown in FIG. 1). Here, the physical component may be a communication circuit board, an electronic component, or the like.

In conclusion, the apparatus for cabinet asset management in the embodiment of the present invention implements, using a wireless technology, power-free multi-module space locating of internal physical components in the communication cabinet, and dynamic and real-time management of asset information, thereby implementing uniform management of internal configuration information of the cabinet.

Figure 2:
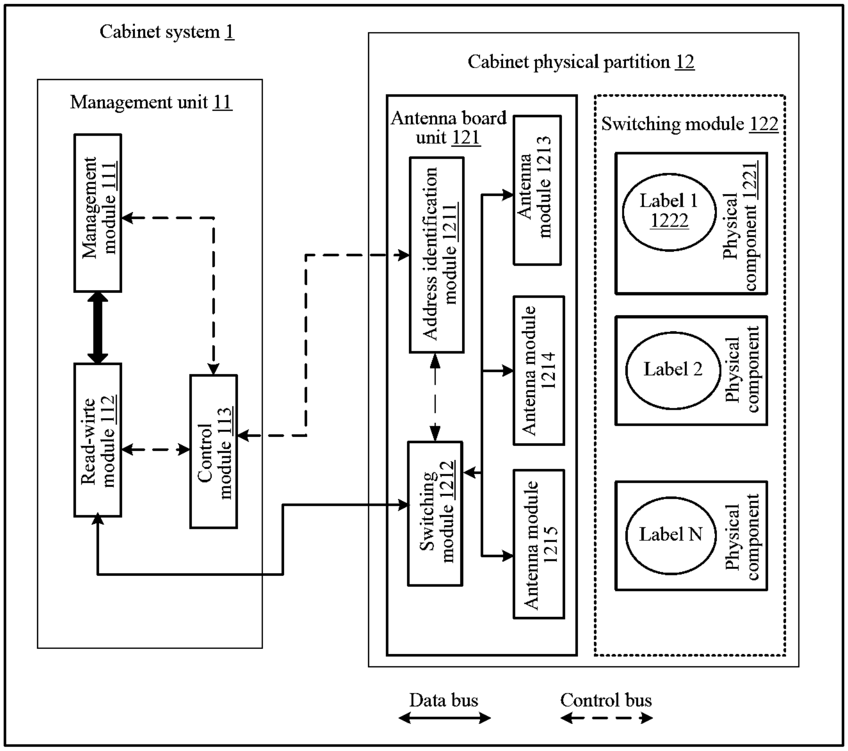
FIG. 2 is a structural connection diagram of a cabinet system according to a specific embodiment of the present invention.

FIG. 2 shows a structural connection diagram of a simplest cabinet system 1. For example, when physical components in the cabinet system 1 is relatively less and distributed regularly, only one cabinet physical partition 12 exists within an apparatus for cabinet asset management in the cabinet system 1, as shown in FIG. 2. A management unit 11 includes a management module 111, a read-write module 112, and a control module 113. An antenna board unit 121 includes an address identification module 1211, a switching module 1212, and one or more antenna modules (such as 1213 to 1215 shown in FIG. 2). In addition, physical components may be placed in a physical component area 122 in the cabinet system 1. Each of the physical components corresponds to one antenna module. As shown in FIG. 2, the physical component area 122 includes a physical component 1221 and a label 1222. The physical component 1221 is in one-to-one correspondence with the label 1222. The label 1222 is in the one-to-one correspondence with the physical component 1222 and the label 1222 stores configuration information of the physical component 1221, where the configuration information may include position information, asset information, a component type and/or manufacturing information, or the like of the physical component 1221. Therefore, the physical component 1221 in the cabinet system 1 can be precisely located using an RFID technology.

It should be noted that the cabinet system which is provided in the embodiment of the present invention and includes three antenna modules and three physical components is only an example and therefore should not be understood as a limitation to the number of antenna modules and the number of physical components of the cabinet system provided in the embodiment of the present invention. It can be understood that, in one embodiment, the number of antenna modules may be any integer that is larger than or equal to the number of physical components. However, in a practical application, taking cost saving into consideration, the number of antenna modules generally equals the number of physical components. For example, the current cabinet system contains 20 physical components and the number of antenna modules is also 20. Further, the physical components are in one-to-one correspondence with the antenna modules.

In the management unit 11, a data signal is transmitted between the management module 111 and the read-write module 112 through a data bus and a control signal is transmitted between the management module 111 and the control module 113 and between the control module 113 and the read-write module 112 through a control bus. In the antenna board unit 121, the data signal is transmitted between the switching module 1212 and one or more antenna modules 1213 through the data bus and the control signal is transmitted between the switching module 1212 and the address identification module 1211 through the control bus.

In addition, the control signal and data signal are also transmitted between the management unit 11 and the antenna board unit 121 through the control bus and the data bus, respectively. Specifically, the data signal is transmitted between the read-write module 112 of the management unit 11 and the switching module 1212 of the antenna board unit 121 through the data bus and the control signal is transmitted between the control module 111 of the manage unit 11 and the address identification module 1211 of the antenna board unit 121 through the control bus.

As can be seen above, in the cabinet system 1 shown in FIG. 2, the management module 111 connects to the read-write module 112 through the data bus and implements connection to the control module 113 through the control bus. The control module 113 implements connection to the read-write module 112 and the address identification module 1211 through the control bus. The read-write module 112 implements connection to the switching module 1212 through the data bus. The address identification module 1211 implements connection to the switching module 1212 through the control bus. The switching module 1212 implements connection to one or more antenna modules 1213 through the data bus.

Therefore, a process of managing the asset information of the internal physical components in the cabinet is: The control module 113 sends a node address message to the address identification module 1211; after receiving the address message, the address identification module 1211 controls the switching module 1212 to switch the data bus to a antenna module 1213 that corresponds to the address message; then, the control module 113 sends a read command to the read-write module 112; after receiving the read command, the read-write module 112 sends a radio frequency signal to the corresponding antenna module 1213; the antenna module 1213 sends the signal in a form of an electromagnetic wave, so that a label within a radiation range of the electromagnetic wave sends, after sensing a magnetic field signal, configuration information stored in the label to the antenna module 1213 using an induction current; subsequently, after receiving the configuration information, the corresponding antenna module 1213 transmits the configuration information to the read-write module 112 through the data bus, and then reports, via the read-write module 112, the configuration information to the management module 111; finally, after receiving the configuration information reported by the corresponding antenna module 1213, the management module 111 performs data analysis processing, where if the configuration information is consistent with information recorded in a configuration library, no processing is performed, and if the configuration information changes, update maintenance of the configuration library is performed.

As can be seen above, the apparatus for cabinet asset management in the embodiment of the present invention implements, using a wireless technology, power-free multi-module space locating of internal physical components in the communication cabinet, and dynamic and real-time management of the asset information, thereby further implementing a uniform management of internal configuration information of the cabinet.

In conclusion, multiple modules or components are involved in the cabinet system 1 and each of the modules or components has a different function.

Specifically, the management module 111 is configured to manage configuration information of a physical component and determine a period for cyclically inquiring the configuration information. The configuration information includes position information, asset information, a component type, and/or manufacturing information. The read-write module 112 is configured to perform conversion between an electronic signal and a radio frequency signal. The control module 113 is configured to control sending of a radio frequency signal of the read-write module 112, configure the period for cyclically inquiring the configuration information, and control, via the address identification module 1211, the switching module 1212 to switch the data bus. In addition, the address identification module 1211 is configured to receive, from the control module 113, a control signal that contains an address of the antenna board part 121 and an address of the physical component 1221, and identify the address of the antenna board part 121 and the address of the physical component 1221, so that the switching module 1212 switches the data bus. The switching board 1212 is configured to switch the radio frequency signal to the antenna module 1213. The antenna module 1213 is configured to radiate the radio frequency signal in the form of the electromagnetic wave and at the same time receives configuration information of the physical component 1221 sent by the label 1222. The label 1222 is configured to store the configuration information of the physical component 1221, send the configuration information using energy obtained from an induction current, or write, into itself, information sent by the antenna module 1213.

FIG. 2 shows a simplest cabinet system structure, that is, one management unit 11 and one cabinet physical partition 12. Generally, the structure of a communication cabinet system is relatively complex and needs to be configured with many physical components. Therefore, physical components need to be divided into multiple cabinet physical partitions 12 in the cabinet system and each of the cabinet physical partitions is configured with an antenna board unit 121.

In an apparatus which is for cabinet asset management and formed of a management unit 11 and multiple antenna board units 121, the multiple antenna board units 121 implement cascading connection through a control bus and a data bus. For example, in the multiple antenna board units 121, address identification modules 1211 implement cascading connection to each other through the control bus and switching modules 1212 implement cascading connection to each other through the data bus, as shown in FIGS. 3A and 3B.

Each cabinet physical partition 12 has a similar structure. The management unit 11 in a cabinet system 1 may be configured inside the cabinet system, and may also be configured outside the cabinet. Likewise, physical components 1221 in physical component areas 122 of each cabinet physical partition 12 still do not need to be powered on, and an antenna board unit 121 only needs to be powered on via the management unit 11. Therefore, the antenna board unit 121 may acquire configuration information of each of the physical components 1221 in the physical component areas 122 using an RFID technology.

Figure 3A:
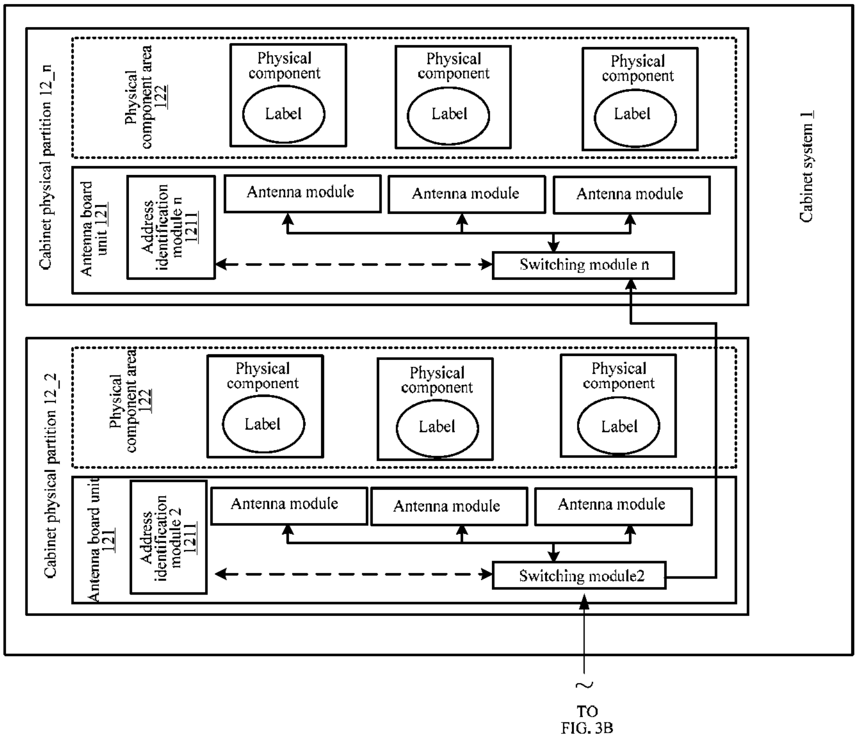
FIGS. 3A and 3B are a structural connection diagram of a cabinet system according to another specific embodiment of the present invention.
Figure 3B:
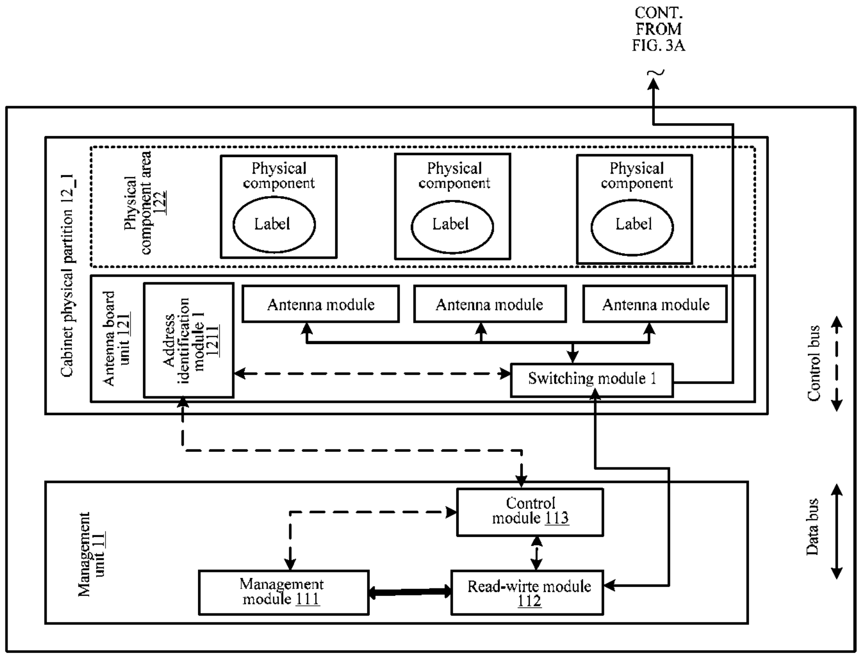
Figure 4:
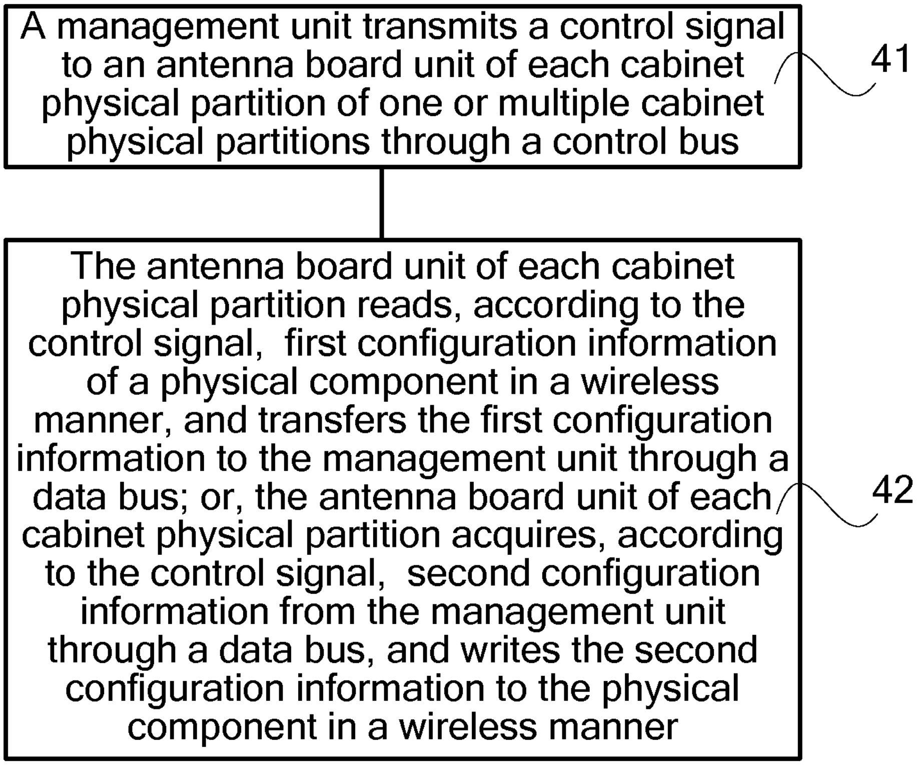
FIG. 4 is a flow chart of a method for cabinet asset management according to an embodiment of the present invention.

As shown in FIGS. 3A and 3B, the cabinet system 1 includes the management unit 11 and multiple cabinet physical partitions 12 (such as cabinet physical partition 12_1 to cabinet physical partition 12_*n*). The multiple cabinet physical partitions 12 implement cascading connection through the control bus and data bus. For example, in the multiple cabinet physical partitions 12, the address identification modules 1211 of the antenna board units 121 in each cabinet physical partition 12 implement cascading connection to each other through the control bus, and meanwhile the switching modules 1212 of the antenna board units 121 implement cascading connection to each other through the data bus.

As can be seen above, the multi-unit and multi-node (that is, multiple physical components) cabinet system shown in FIGS. 3A and 3B has several cabinet physical partitions. Each of the cabinet physical partitions is formed of an antenna board unit and a physical component area, where physical components of which the number corresponds to that of antenna modules in an antenna board unit may be placed in each physical component area. An address identification module in each antenna board unit is configured to identify an address of the antenna board unit and an address of a physical component. A control module implements connection to the address identification module through the control bus. The address identification module of each antenna board unit of the apparatus for cabinet asset management in the cabinet system implements cascading connection to an address identification module of an upper-level antenna board unit through the control bus; a switching module of each antenna board unit of the apparatus for cabinet asset management in the cabinet system implements cascading connection to a switching module of an upper-level antenna board unit through the data bus.

With reference to FIG. 4 to FIG. 7B, the following specifically describes a method for performing cabinet asset management by using a cabinet system in embodiments of the present invention. A cabinet system 1 includes a management unit 11 and one or more cabinet physical partitions 12 (such as 12_1 to 12_*n*), where each cabinet physical partition 12 includes an antenna board unit 121 and a physical component area 122. The method for cabinet asset management shown in FIG. 4 includes:

41. The management unit 11 transmits a control signal to the antenna board unit 121 of each cabinet physical partition 12 of the one or more cabinet physical partitions through a control bus.

42. The antenna board unit 121 of each cabinet physical partition 12 reads, according to the control signal, first configuration information of the physical component area 122 in a wireless manner, and transmits the first configuration information to the management unit 11 through a data bus; or the antenna board unit 121 of each cabinet physical partition 12 acquires, according to the control signal and through a data bus, second configuration information from the management unit 11, and writes the second configuration information to the physical component area 122 in a wireless manner.

Further, the management unit 11 includes a management module 111, a read-write module 112, and a control module 113. The antenna board unit 121 includes an address identification module 1211, a switching module 1212, and an antenna module 1213. The physical component area 122 includes a physical component 1221 and a label 1222, where the physical component 1221 is in one-to-one correspondence with the label 1222. That is, one corresponding label 1222 is set in each physical component 1221. The label 1222 stores configuration information of the corresponding physical component 1221. Specifically, the method for cabinet asset management according to the embodiment of the present invention includes the following steps:

The management module 111 delivers a first control signal, which includes a cycle inquiring period for cyclically inquiring configuration information, to the control module 113 through the control bus, so that the control module 113 configures the cycle inquiring period T according to the first control signal.

Within the cycle inquiring period T, the control module 113 transmits, through the control bus, a second control signal, which includes address information of an antenna board unit and address information of a physical component, to the address identification module 1211 of an antenna board unit 121 that corresponds to an address of the antenna board unit, and transmits the second control signal to the management module 111.

An address identification module 1211 of the antenna board unit 121 that corresponds to the address of the antenna board unit identifies an address of the physical component in the second control signal, and sends, through the control bus, a third control signal to a switching module 1212 of the antenna board unit 121 that corresponds to the address of the antenna board unit.

A switching module 1212 of the antenna board unit 121 that corresponds to the address of the antenna board unit connects, according to the third control signal, the read-write module 112 through the data bus to an antenna module 1213 that corresponds to an address of the physical component, so that the antenna module 1213 sends, to its corresponding physical component 1221, a radio frequency signal from the read-write module 112.

After receiving the radio frequency signal, the physical component 1221 sends first configuration information of the physical component 1221 stored in its corresponding label 1222 to the antenna module 1213 in the wireless manner, so that the antenna module 1213 transmits the first configuration information of the physical component 1221 to the read-write module 112 via the switching module 1212 through the data bus. Alternatively, the physical component 1221 writes second configuration information, which is sent from the read-write module 112 to the antenna module 1213 via the switching module 1212 through the data bus, to its corresponding label 1222 for storing. The second configuration information is configuration information of the physical component 1221 stored in a configuration library of the management module 111.

The read-write module 112 transmits read configuration information of the physical component 1221 to the management module 111 through the data bus. The management module 111 compares the configuration information with the configuration information stored in the configuration library of the management module 111. If inconsistent, the configuration information stored in the configuration library is updated. It should be noted that the configuration library pre-stores configuration information of all physical components in the current cabinet system. If a physical component is newly added or a physical component is replaced in the current system, inconsistency between currently read configuration information and the configuration information stored in the configuration library (that is, the configuration information is not recorded in the configuration library) is caused. At this time, the configuration information in the configuration library needs to be updated.

The configuration information of all physical components in all cabinet physical partitions 12 is compared in turn with the configuration information stored in the configuration library of the management module 111, until the control module 113 detects that the cycle inquiring period T expires.

Figure 5:
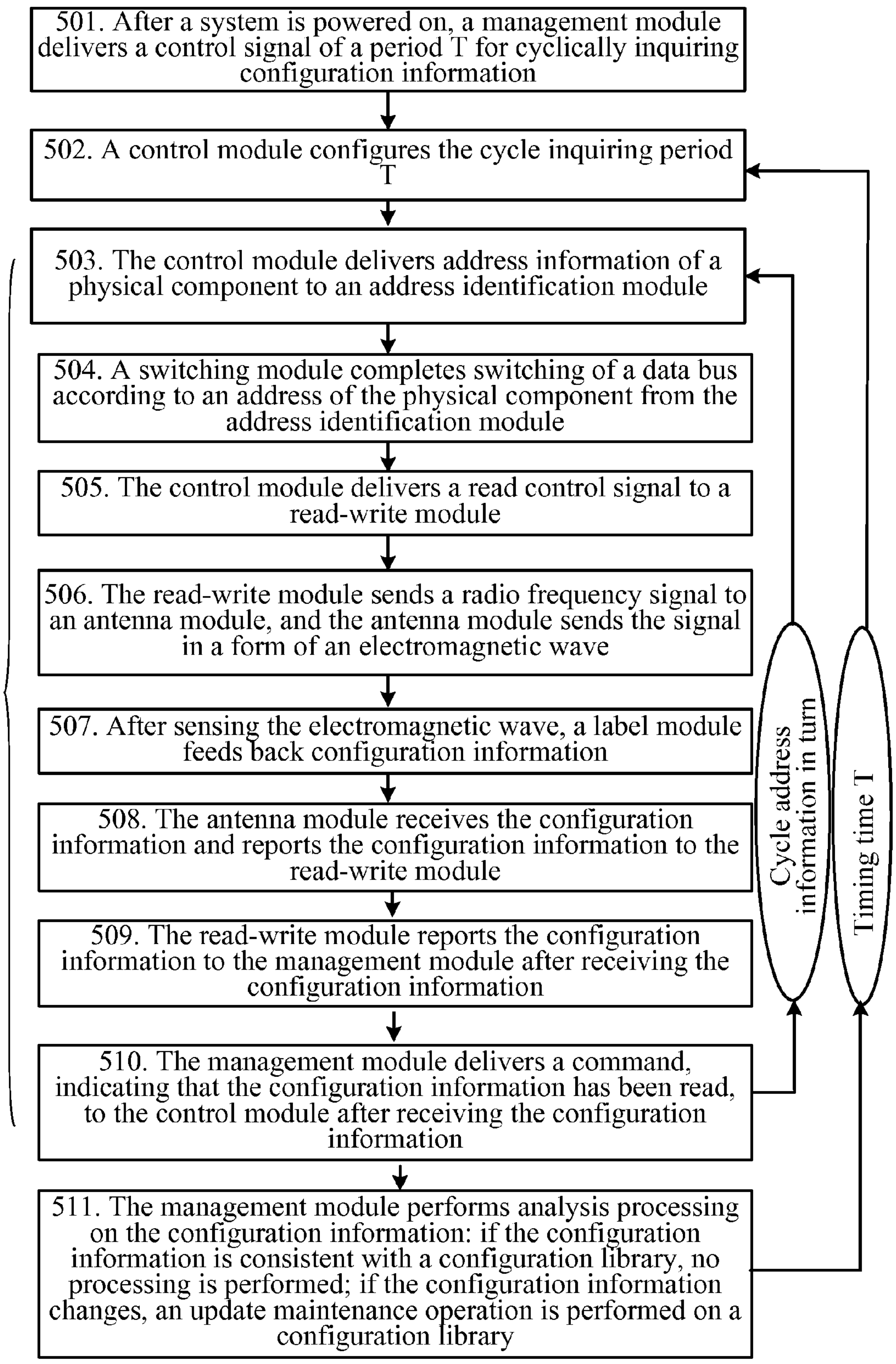
FIG. 5 is a flow chart of identifying a configuration of a physical component in the cabinet system shown in FIG. 2.

FIG. 5 shows an identification, inquiring and processing procedure of a single-unit and multi-node physical space in the cabinet system shown in FIG. 2.

501. After a cabinet system 1 is powered on, a management module 111 establishes a connection to a control module 113 through a control bus, and delivers, to the control module 113, a period T command for cyclically inquiring configuration information of physical components.

502. After receiving the cycle inquiring period T command, the control module 113 completes configuration of a period T.

503. The control module 113 delivers a control signal, which contains address information of each of the physical components, to an address identification module 1211 in turn. Meanwhile, the control module 113 notifies an address of each of the physical components to the management module 111, so that the management module 111 determines corresponding configuration information stored in a configuration library. Because only one cabinet physical partition unit exists in the cabinet 1 shown in FIG. 2, an address of the cabinet physical partition unit is unique. The control signal, which contains the address information of each of the physical components and is sent by the control module 113, may have address information of an antenna board unit of the only one cabinet physical partition unit.

504. After receiving the control signal that includes an address of a physical component, the address identification module 1211 controls a switching module 1212 to switch a data bus to an antenna module 1213 that corresponds to the address.

505. The control module 113 sends a read command to a read-write module 112.

506. After receiving the read command, the read-write module 112 completes sending of a radio frequency signal and transmits the radio frequency signal to the antenna module 1213 through, for example, a coaxial cable, so that the antenna module 1213 then sends an electromagnetic signal in a form of an electromagnetic wave.

507. After a label 1222 within a radiation range of the electromagnetic signal of the antenna module 1213 senses the electromagnetic signal, the label 1222 sends, to the antenna module 1213 and using an induction current, configuration information of a physical component that corresponds to the label and is stored in the label 1222. Here, the configuration information may be position information, asset information, and the like.

508. After receiving the configuration information, the antenna module 1213 transmits the configuration information to the read-write module 112 through the data bus.

509. The read-write module 112 then transmits the configuration information to the management module 111.

510. After receiving the reported configuration information, the management module 111 delivers, to the control module 113, a control signal that indicates that the configuration information has been received. At this time, after receiving the control signal that is delivered by the management module 111 and indicates that the configuration information has been received, the control module 113 starts to inquiring configuration information of a next physical component, to complete reading and reporting of configuration information of all physical components in turn.

511. The management module 111 then performs data analysis and processing at the same time of receiving the reported configuration information. If the received configuration information is consistent with configuration information stored in the configuration library, no processing is performed; if the received configuration information is inconsistent with the configuration information stored in the configuration library, the configuration library is updated by using the received configuration information.

After completing reading of configuration information of all physical components in the cabinet 1, the management module 111 stops working. When it is detected the period T expires, the control module 113 starts again to execute a next round of position identification of all physical components and a processing operation of configuration information.

Figure 6:
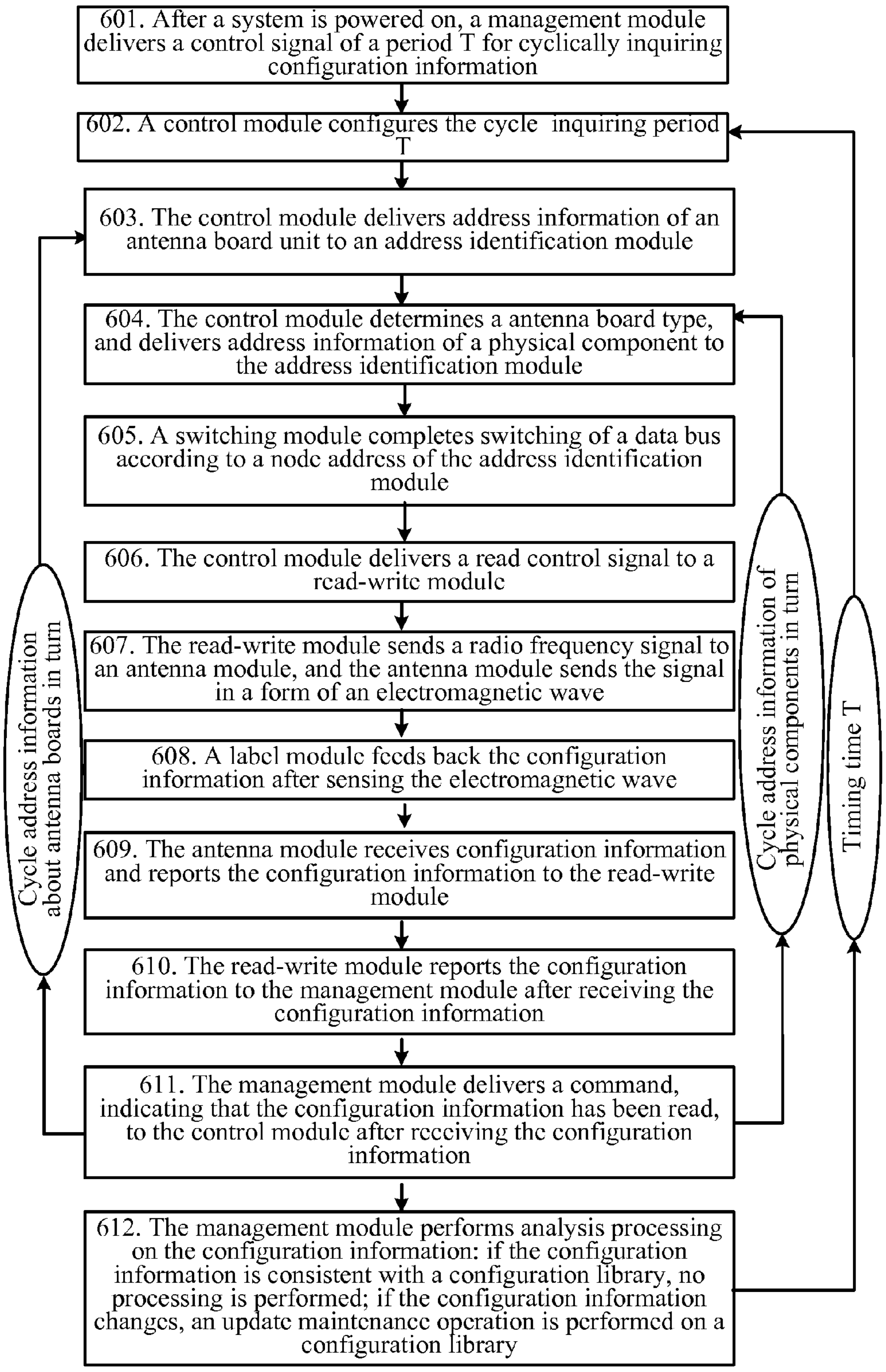
FIG. 6 is a flow chart of identifying a configuration of a physical component in the cabinet system shown in FIGS. 3A and 3B.

FIG. 6 shows an identification, inquiring and processing procedure of a multi-unit and multi-node physical space in the cabinet system shown in FIGS. 3A and 3B. In multiple cabinet physical partition units shown in FIGS. 3A and 3B, address identification modules of all antenna board units implement cascading connection to each other through a control bus, and switching modules of all antenna board units implement cascading connection through a data bus. An address identification module of only one antenna board unit connects to a control module, and a switching module of only one antenna board unit connects to a read-write module. Compared with the procedure shown in FIG. 5, this procedure adds functions of identification and processing of the address of an antenna board unit in a multi-node solution.

601. When a cabinet 1 is powered on, a management module 111 establishes a connection to a control module 113 through a control bus and delivers a period T command for cyclically inquiring configuration information of physical components to the control module 113.

602. After receiving the cycle inquiring period T command, the control module 113 completes configuration of a period T.

603. After completing the configuration of the cycle inquiring period T, the control module 113 first delivers a control signal, which contains an address of an antenna board unit, to an address identification module 1211 of an antenna board unit 121 that corresponds to the address of the antenna board unit, so that the address identification module 1211 determines the address of the antenna board unit.

604. The control module 113 then delivers a control signal, which contains address information of a physical component, to the address identification module 1211 of the antenna board unit 121 that corresponds to the address of the antenna board unit.

605. After receiving the address information of the physical component, the address identification module 1211 controls a switching module 1212 to switch the data bus to an antenna module 1213 that corresponds to the address of the physical component.

606. The control module 113 sends a read command to a read-write module 112.

607. After receiving the read command, the read-write module 112 completes sending of a radio frequency signal, and transmits the radio frequency signal to the antenna module 1213 through, for example, a coaxial cable, so that the antenna module 1213 then sends an electromagnetic signal in a form of an electromagnetic wave.

608. After a label 1222 within the radiation range of the electromagnetic signal of the antenna module 1213 senses the electromagnetic signal, the label 1222 sends, to the antenna module 1213 and using an induction current, configuration information of a physical component that corresponds to the label and is stored in the label 1222. Here, the configuration information may be position information, asset information, or the like.

609. After receiving the configuration information, the antenna module 1213 transmits the configuration information to the read-write module 112 through the data bus.

610. The read-write module 112 then transmits the configuration information to the management module 111.

611. After receiving the reported configuration information, the management module 111 delivers, to the control module 113, a control signal that indicates that the configuration information has been received. Meanwhile, after receiving the control signal that is delivered by the management module 111 and indicates that the configuration information has been received, the control module 113 starts to inquire configuration information of a next physical component, to complete reading and reporting of configuration information of all physical components in turn. After completing, according to an address sequence of physical components that correspond to the antenna board unit, reading of configuration information of all physical components and updating of a configuration library in turn, the control module 113 starts to inquire an address of an antenna board unit in a next cabinet physical partition unit and completes delivery of address information of the antenna board unit. After determining an antenna board type, the control module 113 delivers the address information of the antenna board unit and completes reading of configuration information of all physical components in the cabinet physical partition unit and an operation of updating the configuration library in turn.

612. The management module 111 further performs data analysis and processing at the same time of receiving the reported configuration information. If the received configuration information is consistent with configuration information stored in the configuration library, no processing is performed; if the received configuration information is inconsistent with the configuration information stored in the configuration library, the configuration library is updated by using the received configuration information.

In other words, each time after reading of configuration information of all physical components in one unit and updating of the configuration library are completed, an address of an antenna board unit is switched in turn, and reading of configuration information of all physical components in the cabinet physical partition unit that corresponds to the antenna board unit and updating of the configuration library are completed. After completing reading of configuration information of all physical components in all units in the cabinet 1 and the operation of updating the configuration library, the management module 111 stops working.

When it is detected that the period T expires, the control module 113 starts again to execute a next round of position identification of all physical components and a processing operation of configuration information.

Figure 7A:
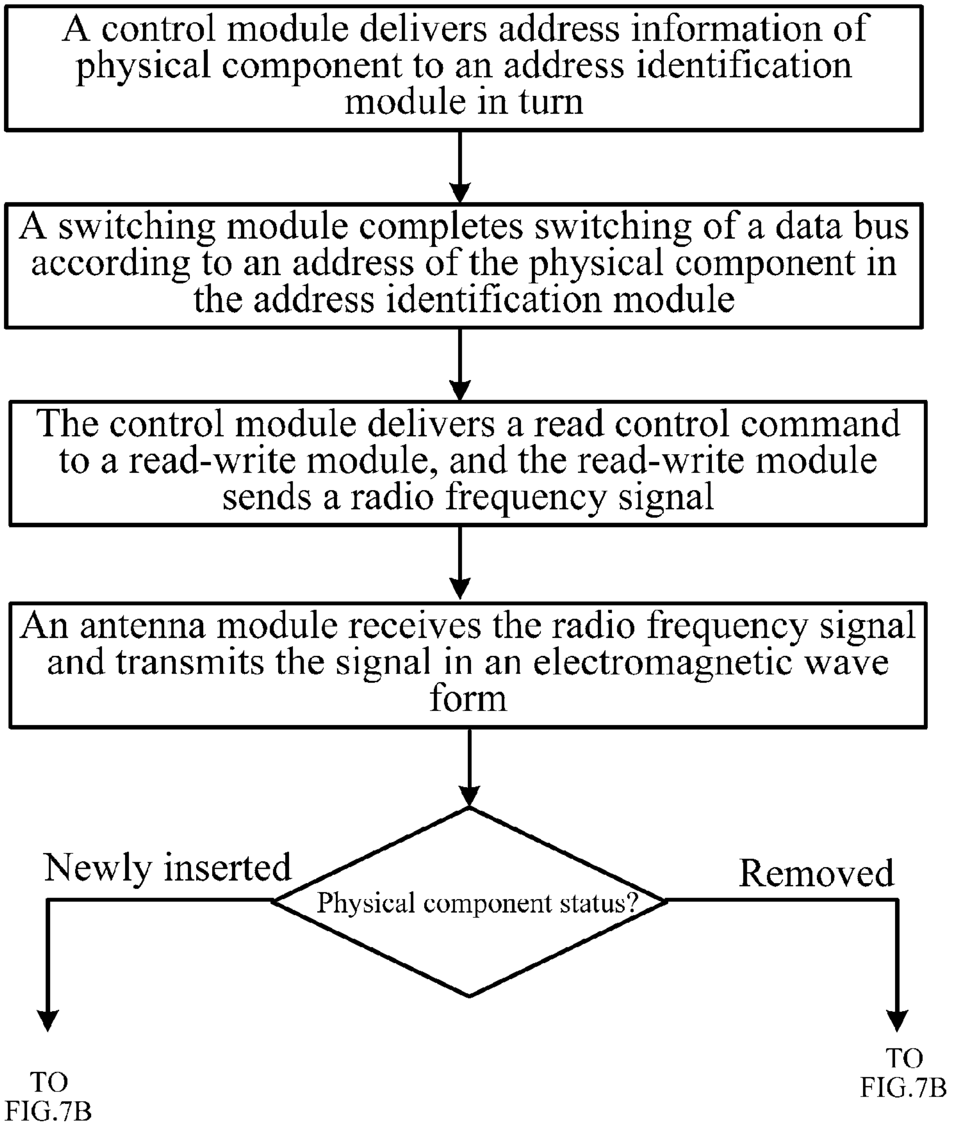
FIG. 7A and FIG. 7B are a flow chart of identifying a situation that a physical component is newly inserted or removed inside a cabinet system.
Figure 7B:
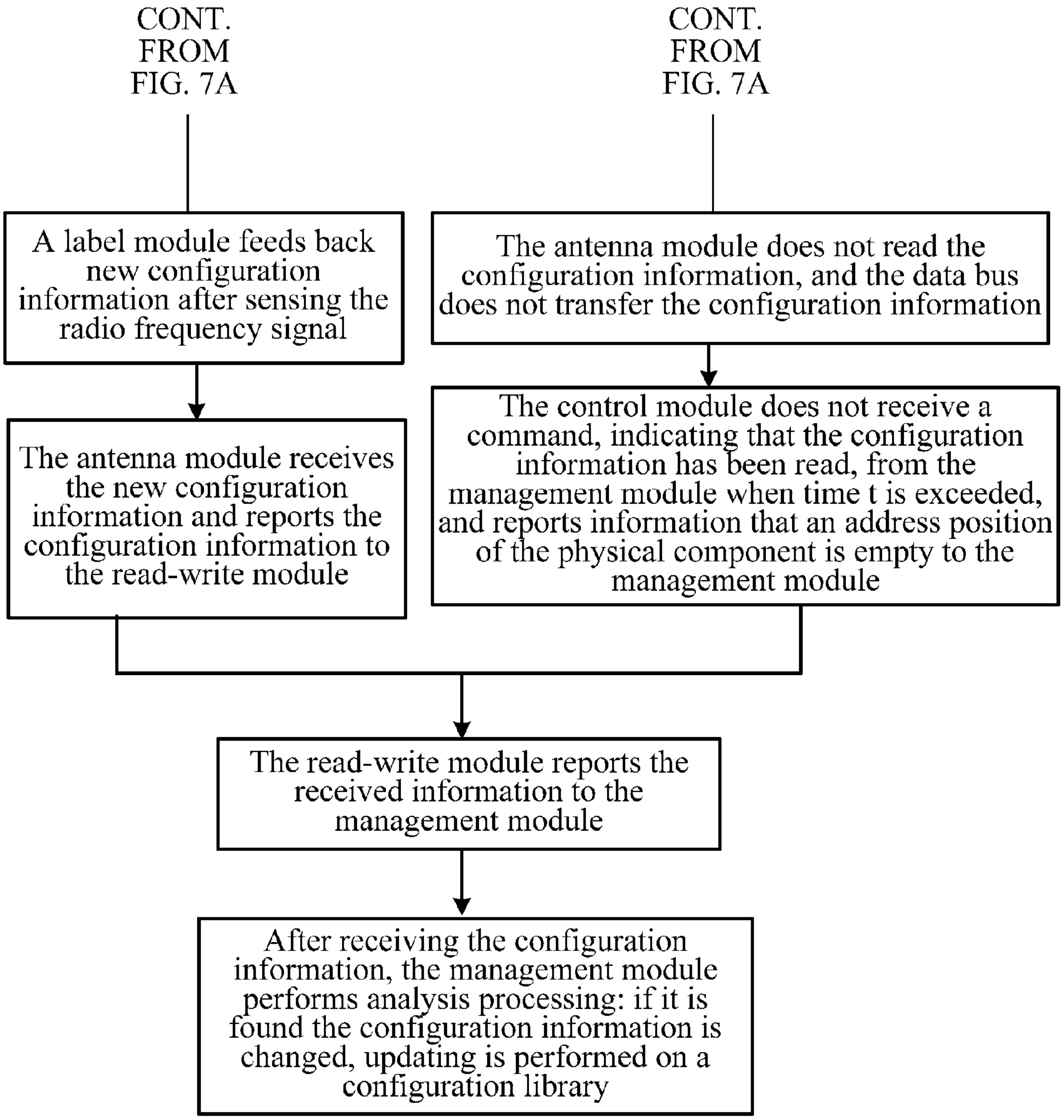

When a physical component is newly inserted or removed inside the cabinet system, the configuration information of the newly inserted physical component may be acquired and whether the physical component is removed is identified according to the identification method, as shown in FIG. 7A and FIG. 7B.

In the procedure of cyclically inquiring and processing configuration information, after a new physical component 1221 is inserted, a label module 1222 sends configuration information of the newly inserted physical component 1221 to an antenna module 1213 using an induction current. Then, after receiving the configuration information of the new physical component, the antenna module 1213 transmits the configuration information to the read-write module 112 via the switching module 1212 through the data bus, and then the read-write module 112 reports the configuration information to the management module 111. After receiving the reported configuration information of the new physical component, the management module 111 finds, after performing analysis processing, that the configuration information is new configuration information, and then the management module 111 performs update maintenance processing on the configuration library.

Alternatively, in the foregoing procedure of cyclically inquiring and processing configuration information, when a physical component 1221 is removed, the antenna module 1213 continuously sends an electromagnetic signal, but does not read configuration information fed back by the label 1222, and therefore cannot transmit the configuration information to the management module 111 through the data bus. The management module 111 then does not send, to the control module 113, a control signal that indicates that the configuration information has been received. When time t is exceeded, the control module 113 still has not received a control signal which is from the management module 111 and indicates that the configuration information has been received. The control module 113 reports, to the management module 111, information that an address position of the physical component 1221 is null. After receiving the null configuration information, the management module 111 performs null setting and update processing on configuration information of the physical component that corresponds to the address of the physical component and is in the configuration library.

Figure 8A:
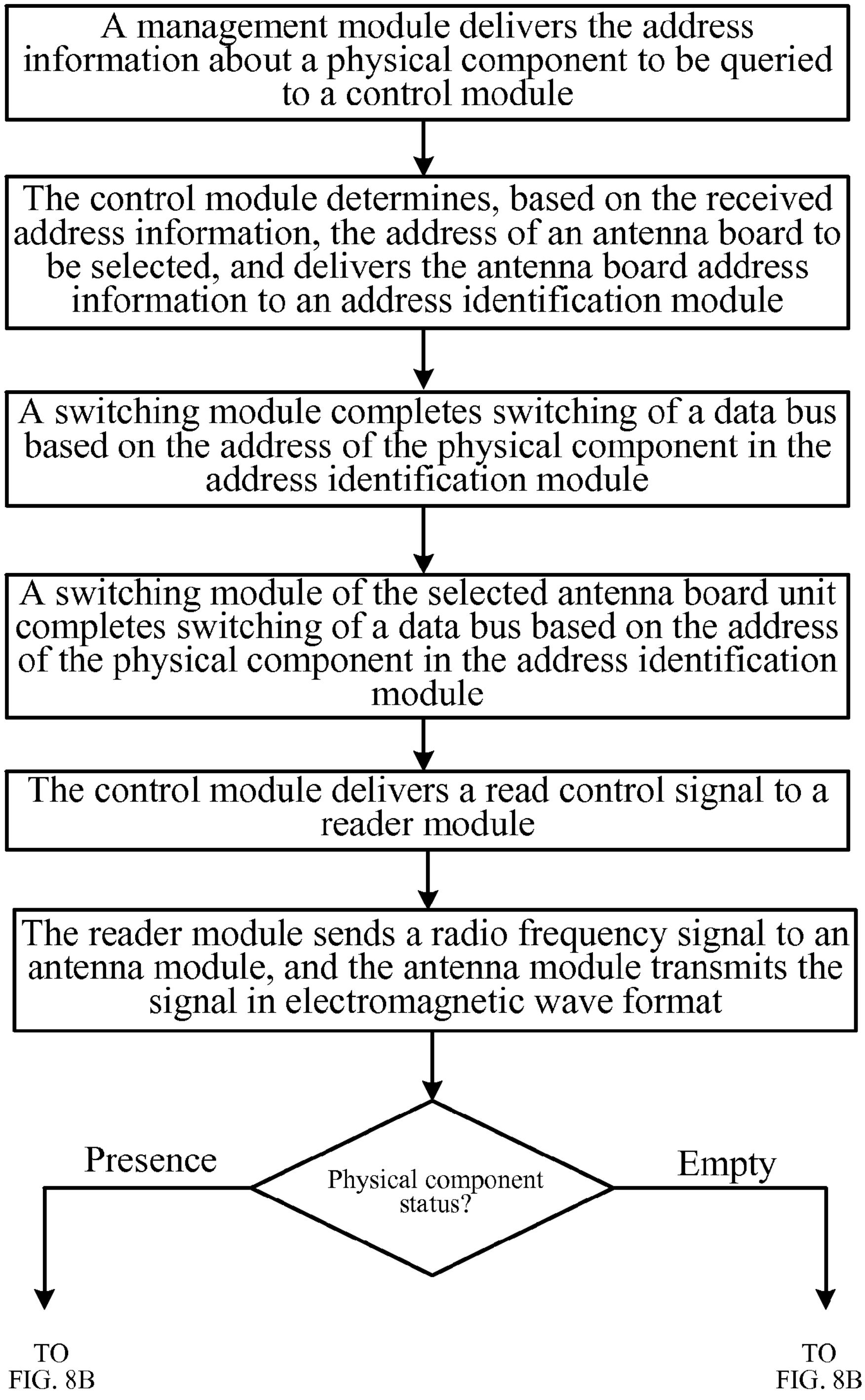
FIG. 8A and FIG. 8B are a flow chart of identifying and automatically inquiring a configuration of an internal physical component in a cabinet system.
Figure 8B:
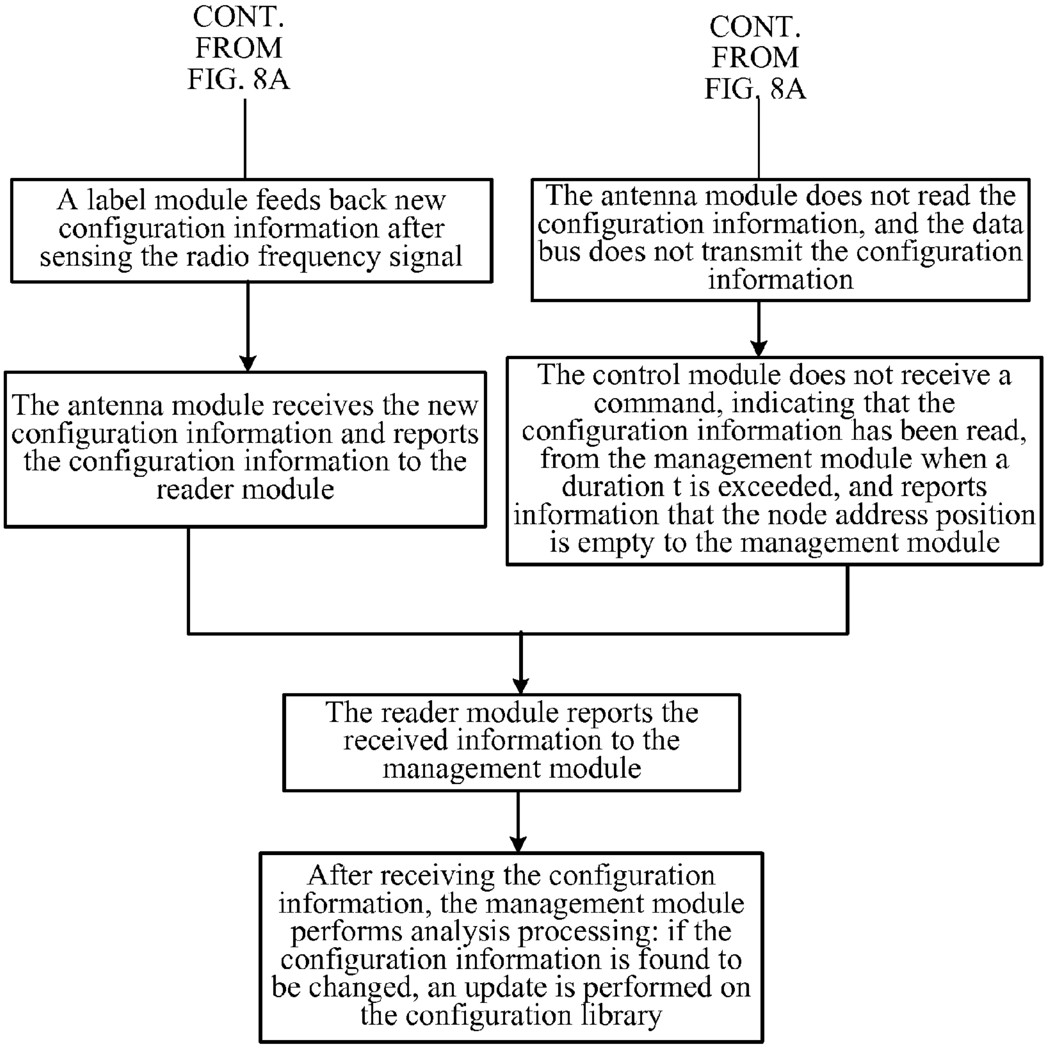

In addition, as shown in FIG. 8A and FIG. 8B, the cabinet system may also automatically inquires, according to address information of a physical component, a configuration situation of the physical component at the address in the current cabinet. For example, the management module 111 first delivers address information of the to-be-inquired physical component 1221 to a control module 113; after receiving the address information, the control module 113 determines, according to the address information, an address of a to-be-selected antenna board, and delivers address information of the antenna board to an address identification module 1211; a switching module 1212 where an antenna board unit 121 is located completes switching of the data bus according to an address of the physical component in the address identification module 1211; and then the cabinet system 1 completes reading of the configuration information that corresponds to the physical component 1221 and an operation of updating the configuration library.

The embodiments of the present invention provide an apparatus for cabinet asset management, a cabinet system, and a method for cabinet asset management, which can implement space locating of internal physical components in a communication cabinet and dynamic and real-time management of asset information, reduce complexity of maintenance and management of asset information of the internal physical components in the cabinet, and implement a real-time update of asset configuration information.

A cabinet in the embodiments of the present invention implements identification and locating of a space position of an internal physical component in a communication cabinet by using an RFID technology, and solves a problem of a failure in precise locating in an existing communication cabinet. In addition, a method for cabinet asset management in the embodiments of the present invention may further save manual configuration, simplify operations, implement real-time, dynamic, and non-manual maintenance of configuration information of internal physical components in the cabinet and power-free management of components, implement tracing and inventory management of cabinet assets, and reduce maintenance costs, thereby reducing operation and maintenance costs of a customer. In other words, the cabinet and the method for cabinet asset management according to the embodiments of the present invention implement position of internal passive physical components and asset information management of the cabinet, thereby implementing uniform management of internal configuration information of the cabinet.

Persons of ordinary skill in the art can be aware that, units and algorithm steps in combination with the examples described in the embodiments disclosed in this document can be implemented by electronic hardware, or a combination of computer software and electronic hardware. Whether these functions are executed in hardware or software manner depends on particular applications and design constraint conditions of the technical solutions. Persons skilled in the art can use different methods to implement the described functions for every particular application, but it should not be deemed that the implementation goes beyond the scope of the present invention.

Persons skilled in the art can clearly understand that, for a purpose of convenient and brief description, for detailed working processes of the foregoing system, apparatus and unit, reference may be made to the corresponding processes in the foregoing method embodiments, and the details will not be described herein again.

In the several embodiments provided in this application, it should be understood that the disclosed system, apparatus, and method may be implemented in other manners. For example, the described apparatus embodiments are merely exemplary. For example, the division of units is merely logical function division and there may be other division manner in actual implementation. For example, multiple units or components can be combined or integrated into another system, or some features can be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, that is, may be located in one position, or may be distributed on multiple network elements. Part or all of the units may be selected according to the actual requirements to achieve the objectives of the solutions of the embodiments.

In addition, functional units in the embodiments of the present invention may be integrated into one processing unit, or each of the units may exist alone physically, or two or more units are integrated into one unit.

When being implemented in a form of a software functional unit and sold or used as an independent product, the functions may be stored in a computer-readable storage medium. Based on such understanding, essence of the technical solutions of the present invention, or the part contributing to the prior art, or part of the technical solutions may be implemented in a form of a software product. The computer software product is stored in a storage medium, and includes several instructions for instructing a computer device (which may be a personal computer, a server, a network device, or the like) to execute all or part of the steps of the method described in the embodiments of the present invention. The storage medium includes: any medium that can store program codes, such as a U-disk, a removable hard disk, a read-only memory (ROM, Read-Only Memory), a random access memory (RAM, Random Access Memory), a magnetic disk, or an optical disk.

The foregoing descriptions are merely exemplary embodiments of the present invention, but not intended to limit the protection scope of the present invention. Any variation or replacement that can be easily figured out by persons skilled in the art within the disclosed technical scope of the present invention shall fall within the protection scope of the present invention. Therefore, the protection scope of the present invention shall be subject to the protection scope of the appended claims.

What is claimed is:

1. An apparatus for cabinet asset management, comprising:

a management unit including a management module, a read-write module, and a control module; and an antenna board unit including an address identification module, a switching module, and at least one antenna module;

wherein the management unit and the antenna board unit are connected through a data bus and a control bus, wherein the management unit is configured to send a read signal to the antenna board unit through the data bus, to instruct the antenna board unit to acquire configuration information of a physical component, wherein the antenna board unit is configured to receive a control signal and the read signal, to send the read signal in a form of an electromagnetic wave, to receive the configuration information of the physical component from a label within a radiation range of the electromagnetic wave after the read signal is received, and to report the configuration information to the management unit through the data bus, wherein the label is located on the physical component and is configured to store the configuration information of the physical component, and wherein the management unit is further configured to receive the configuration information reported by the antenna board unit and to perform analysis processing on the configuration information, wherein the management module connects to the control module through the control bus, wherein the switching module and the at least one antenna module are connected through the data bus, wherein the read-write module is configured to receive a data signal through the data bus from the switching module, wherein the control module is configured to transmit the control signal through the control bus to the address identification module, wherein the control signal contains an address of the antenna board unit and an address of the physical component, wherein the control module is configured to send the control signal to the address identification module of the antenna board unit that corresponds to the address of the antenna board unit contained in the control signal and the read signal to the read-write module, wherein the address identification module is configured to receive the control signal to identify the address of the antenna board unit and the address of the physical component contained in the control signal, and to control the switching module to switch the data bus to the antenna module that corresponds to the address of the physical component, wherein the read-write module is configured to receive the read signal and to send the read signal to the antenna module, wherein the antenna module is configured to, after the read signal is received, send the read signal in the form of the electromagnetic wave, to receive the configuration information of the physical component, to transmit the configuration information to the read-write module, and to report the configuration information to the management module via the read-write module, wherein the configuration information is sent by the label within the radiation range of the electromagnetic wave after the read signal is received, and wherein the management module is configured to receive the configuration information reported by the read-write module and to perform the analysis processing on the configuration information.

2. The apparatus according to claim 1, wherein the configuration information comprises at least one of: position information, asset information, a component type, and manufacturing information.

3. The apparatus according to claim 1, further comprising multiple antenna board units that implement a cascading connection through the control bus and the data bus.

4. The apparatus according to claim 3, wherein the multiple antenna board units that implement the cascading connection through the control bus and the data bus include address identification modules that are configured to implement the cascading connection to each other through the control bus and switching modules that are configured to implement the cascading connection to each other through the data bus.

5. A cabinet system, comprising:

an apparatus for cabinet asset management comprising:

a management unit including a management module, a read-write module, and a control module; and an antenna board unit including an address identification module, a switching module and at least one antenna module; and at least one physical component having a corresponding label that stores configuration information of the corresponding physical component;

wherein the management unit and the antenna board unit are connected through a data bus and a control bus, wherein the management unit is configured to send a read signal to the antenna board unit through the data bus, to instruct the antenna board unit to acquire the configuration information of the physical component, to receive the configuration information reported by the antenna board unit, and to perform analysis processing on the configuration information;

wherein the antenna board unit is configured to receive the read signal, to send the read signal in a form of an electromagnetic wave, to receive the configuration information of the corresponding physical component from the label within a radiation range of the electromagnetic wave after the read signal is received, and to report the configuration information to the management unit through the data bus, wherein the at least one antenna module is at least in one-to-one correspondence with the physical component, wherein the management module connects to the control module through the control bus, wherein the switching module and the antenna module are connected through the data bus, wherein the read-write module is configured to receive a data signal through the data bus from the switching module, wherein the control module is configured to transmit the control signal through the control bus to the address identification module, wherein the control signal contains an address of the antenna board unit and an address of the physical component, wherein the control module is configured to send the control signal to the address identification module of the antenna board unit that corresponds to the address of the antenna board unit contained in the control signal and the read signal to the read-write module, wherein the address identification module is configured to receive the control signal to identify the address of the antenna board unit and the address of the physical component contained in the control signal, and to control the switching module to switch the data bus to the antenna module that corresponds to the address of the physical component, wherein the read-write module is configured to receive the read signal and to send the read signal to the antenna module, wherein the antenna module is configured to send the read signal in the form of the electromagnetic wave after receiving the read signal, to receive the configuration information of the physical component, to transmit the configuration information to the read-write module, and to report the configuration information to the management module via the read-write module, wherein the configuration information is sent by the label within the radiation range of the electromagnetic wave after the read signal is received, and wherein the management module is configured to receive the configuration information reported by the read-write module and to perform the analysis processing on the configuration information.

6. The system according to claim 5, wherein the configuration information comprises at least one of: position information, asset information, a component type, and manufacturing information.

7. The system according to claim 5, wherein the apparatus for the cabinet asset management further comprises multiple antenna board units that implement a cascading connection through the control bus and the data bus.

8. The system according to claim 7, wherein the multiple antenna board units that implement the cascading connection through the control bus and the data bus include address identification modules that are configured to implement the cascading connection to each other through the control bus and switching modules that are configured to implement the cascading connection to each other through the data bus.

9. A method for cabinet asset management, wherein a cabinet comprises a management unit having a management module, a read-write module, and a control module, and one or more cabinet physical partitions, each of the cabinet physical partitions comprising an antenna board unit having an address identification module, a switching module, and an antenna module, and one or more physical components, each having a corresponding label that stores configuration information of the corresponding physical component, the method comprising:

transmitting, by the management unit, a control signal to the antenna board unit of each cabinet physical partition of the one or more cabinet physical partitions through a control bus, wherein the control signal comprises address information of one of the physical components;

according to the control signal, reading, by the antenna board unit in each cabinet physical partition, first configuration information of the physical component;

transmitting the first configuration information to the management unit through a data bus;

delivering, by the management module of the management unit to the control module through the control bus, a first control signal comprising a cycle inquiring period for cyclically inquiring configuration information, so that the control module configures the cycle inquiring period according to the first control signal;

transmitting, by the control module through the control bus and within the cycle inquiring period to an address identification module of the antenna board unit that corresponds to an address of the antenna board unit, a second control signal comprising address information of the antenna board unit and address information of the physical component;

transmitting the second control signal to the management module;

identifying, by the address identification module of the antenna board unit that corresponds to the address of the antenna board unit, an address of the physical component in the second control signal;

sending a third control signal to a switching module of the antenna board part that corresponds to the address of the antenna board unit;

switching, by the switching module of the antenna board unit that corresponds to the address of the antenna board unit according to the third control signal, the data bus to an antenna module that corresponds to the address of the physical component so that the antenna module sends, to its corresponding physical component, a radio frequency signal from the read-write module;

sending, by a label that corresponds to the physical component after the radio frequency signal is received, its stored first configuration information of the physical component to the antenna module in the wireless manner, so that the antenna module transmits the first configuration information of the physical component to the read-write module via the switching module through the data bus;

transmitting, by the read-write module, the read first configuration information to the management module through the data bus;

comparing, by the management module, the first configuration information with configuration information pre-stored in a configuration library; and updating the configuration information stored in the configuration library if the first configuration information is consistent with the configuration information pre-stored in the configuration library; or storing, by the label that corresponds to the physical component, second configuration information that is sent from the read-write module to the antenna module.

10. A method for cabinet asset management, wherein a cabinet comprises a management unit having a management module, a read-write module, and a control module, and one or more cabinet physical partitions, each of the cabinet physical partitions comprising an antenna board unit having an address identification module, a switching module, and an antenna module, and one or more physical components, each having a corresponding label that stores configuration information of the corresponding physical component, the method comprising:

transmitting, by the management unit, a control signal to the antenna board unit of each cabinet physical partition of the one or more cabinet physical partitions through a control bus, wherein the control signal comprises address information of one of the physical components;

acquiring, by the antenna board unit of each cabinet physical partition, according to the control signal, second configuration information from the management unit through a data bus;

writing the second configuration information into the physical component in a wireless manner;

delivering by the management module of the management unit of the control module through the control bus, a first control signal comprising a cycle inquiring period for cyclically inquiring configuration information, so that the control module configures the cycle inquiring period according to the first control signal;

transmitting, by the control module through the control bus and within the cycle inquiring period to an address identification module of the antenna board unit that corresponds to an address of the antenna board unit, a second control signal comprising address information of the antenna board unit and address information of a physical component;

transmitting the second control signal to the management module;

identifying, by the address identification module of the antenna board unit that corresponds to the address of the antenna board unit, an address of the physical component in the second control signal;

sending a third control signal to a switching module of the antenna board part that corresponds to the address of the antenna board unit;

switching, by the switching module of the antenna board unit that corresponds to the address of the antenna board unit according to the third control signal, the data bus to an antenna module that corresponds to the address of the physical component, so that the antenna module sends, to its corresponding physical component, a radio frequency signal from the read-write module;

sending, by a label that corresponds to the physical component after the radio frequency signal is received, its stored first configuration information of the physical component to the antenna module in the wireless manner, so that the antenna module transmits the first configuration information of the physical component to the read-write module via the switching module through the data bus;

transmitting, by the read-write module, the read first configuration information to the management module through the data bus;

comparing, by the management module, the first configuration information with configuration information pre-stored in a configuration library; and updating the configuration information stored in the configuration library if the first configuration information is consistent with the configuration information pre-stored in the configuration library; or storing by the label to the physical component, the second configuration information that is sent from the read-write module to the antenna module.

* * * * *

UNITED STATES PATENT AND TRADEMARK OFFICE

CERTIFICATE OF CORRECTION

PATENT NO. : 8,872,630 B2
APPLICATION NO. : 13/661845
DATED : October 28, 2014
INVENTOR(S) : Duan et al.

It is certified that error appears in the above-identified patent and that said Letters Patent is hereby corrected as shown below:

Title Page, Item (71) Applicant, "Guangdong (CN)" should read --Shenzhen (CN)--.

Signed and Sealed this
Twenty-third Day of June, 2015

Michelle K. Lee

Michelle K. Lee
*Director of the United States Patent and Trademark Office*